Patented Feb. 23, 1932

1,846,164

UNITED STATES PATENT OFFICE

DOUGLAS FRANK TWISS AND EDWARD ARTHUR MURPHY, OF ERDINGTON, BIRMINGHAM, ENGLAND, ASSIGNORS TO DUNLOP RUBBER COMPANY LIMITED, OF LONDON, ENGLAND, A BRITISH COMPANY

MANUFACTURE OF RUBBER AND SIMILAR VEGETABLE RESINS

No Drawing. Application filed November 11, 1927, Serial No. 232,705, and in Great Britain November 13, 1926.

This invention relates to improvements in the manufacture of rubber and similar vegetable resins and its object is to provide an improved method for treating and concentrating rubber latex and similar latices so as to render it or them suitable for conversion to finished articles or for other purposes.

It has already been proposed to produce a solid or pasty water-soluble product from such latices—reconvertible into the original latex on the addition of water—by mixing protective colloids with the latex so as to impede coagulation and subsequently removing the water therefrom. It has also been proposed to add compounding and vulcanizing ingredients to the paste thus formed.

Still more recently a process for the production of vulcanized concentrated latex in which the rubber globules are present in a vulcanized condition has been disclosed.

A difficulty experienced in effecting mixings with latex is the tendency of the ingredients introduced to form agglomerates which result in a depreciation of the physical character of the subsequently manufactured article. Considerable difficulty is also experienced in avoiding the incorporation of air in the mixture which causes blisters to appear in the finished product.

According to this invention we prepare concentrated latex by adding compounding ingredients to the latex before the concentration process is effected. The term "compounding ingredients" includes for the purpose of this invention the usual additions, for instance vulcanizing agents such as sulphur, fillers and reinforcing agents such as whiting, clay, barium, sulphate, lithopone, lamp black, gas black, zinc oxide, or even powdered ebonite, accelerators of vulcanization, colouring matters and preservatives, softeners such as oils, "rubber substitute", petroleum jelly, "mineral rubbers", waxes, emulsified reclaimed rubber, etc., or antiagers such as aldol-d-naphthylamine, while the term "latex" hereinafter used includes aqueous dispersions containing rubber or similar vegetable resins either in a natural or artificial form.

The compounding ingredients are added in the presence of suitable stabilizers, for which purpose we may employ colloids such as glue, gelatin, casein, vegetable gums, dextrin or soap or an alkali capable of reacting with the natural resin acids of the latex. We may further employ for this purpose sodium silicate or other saline substances capable of imparting an alkaline reaction, such as viscose.

In the preferred method of carrying our invention into effect we include in the stabilizing materials a nonvolatile alkali and/or an alkali metal derivative of a colloid in the minimum proportion sufficient to enable concentration without immediate coagulation of the latex. The said alkali colloid may be prepared for example from an organic acid of high molecular weight such as oleic or stearic acid by adding an alkali hydroxide or from protein substances, for example casein, or from carbohydrate derivatives such as cellulose xanthic acid and may be introduced into the latex as such or substances may be introduced into the latex so that it is formed by chemical reaction therein. A total proportion of alkali which it is desirable to add in the stabilizing materials is up to 1% by weight of the rubber content of the latex.

Ammonia-preserved latex is particularly suitable for the purpose described and enables a reduction in the proportion of non-volatile alkali or alkaline substances which may be used to impart stability during concentration.

The stabilizers may be introduced into the latex before or at the same time as the compounding ingredients or the stabilizers and the compounding ingredients may be first mixed together and subsequently introduced into the latex. The latex is then concentrated by direct evaporation or by evaporation in vacuo or by spraying or by centrifuging in a known type of centrifuge or by other suitable means. It is possible by this process to effect concentration of the latex to a marked degree without coagulation taking place since the stabilizing agents perform the double purpose of dispersing the compounding ingredients and preventing coagulation of the latex.

We prefer when the stabilizers and compounding ingredients are added to the latex to impart a gentle continuous mixing action thereto so as to produce a smooth dispersion with the mixture free from air bubbles and pockets or agglomerates of dry powder.

An example of our process is as follows:—

8 parts of zinc oxide, 2.5 parts of sulphur, lamp black 1, talc 20, whiting 15, paraffin wax 2 (previously emulsified in water) mineral rubber 1 (previously finely ground), are mixed with 100 parts of water containing 0.1 part of caustic potash, 0.3 part of oleic acid and 0.3 part of casein. A sufficient degree of dispersion for this stage can be attained in a few minutes. Ammonia-preserved latex is then added in sufficient quantity to introduce 60 parts of rubber, caustic potash having been previously introduced into the latex so that the 60 parts of rubber are accompanied by 0.4 part of caustic potash. The whole is then mixed and concentrated by direct evaporation. A concentration to 75% total solids is convenient especially if the product is to be used for dipping operations.

At the completion of the concentration the mixture is allowed to cool, the agitation being still continued whilst ammonia (e. g. 1 part of concentrated aqueous ammonia of specific gravity 0.880) is added; an accelerator in suitable amount such as 0.3 part of diethyl-ammonium-diethyldithiocaronate may, if desired, be introduced at the same time. It is desirable to continue the agitation for a short time e. g. a few minutes until the ammonia (with any accelerator) is uniformly dispersed.

Another example of our process is as follows:—

20 parts of whiting, 2 parts of zinc oxide, 1 part of organic dye e. g. tolueneazo-naphthol, 1½ of sulphur 0.5 part of tetramethyl thiuram monosulphide, 3 parts of petroleum jelly (emulsified in water), 8 parts of lithopone, are placed in a mixer and concentrator together with 100 parts of water containing in solution 0.3 part of oleic acid, 0.2 part of casein and 0.1 part of caustic potash. After a smooth dispersion has been obtained by agitation sufficient latex is added to introduce 64 parts of rubber together with 0.5 parts of caustic potash. The whole is then mixed under gentle agitation and concentrated to the desired consistency. In any case it is desirable to continue the agitation and mixing action until the final mixture is obtained in a uniform condition. Stable cream containing up to 80% of total solids can be obtained in this way.

A third example which yields a mixing giving, on subsequent vulcanization, ebonite, is as follows:—

12 parts of barytes, 12 parts of whiting, 5 parts of lamp black and 5 parts of zinc oxide are mixed with 100 parts of water containing 0.5 part of oleic acid, 0.3 part of glue and 0.2 part of caustic potash. Sufficient alkaline latex is added to introduce 40 parts of rubber and 0.5 of caustic potash, and the mixture subjected to concentration. During the latter part of the concentration operation 25 parts of sulphur dispersed in 200 parts of water together with 1 part (or more) of piperidine piperidine-carbothionolate are added and the concentration continued until the desired consistency and uniformity are obtained.

The resultant uniform concentrated dispersions are especially suitable for the manufacture of goods and articles by spreading or dipping or deposition by mechanical, chemical, electrical or electrophoretic means on suitably shaped formers or deposition backings. Again the dispersions may be used for coating articles or goods made of or covered with rubber or similar material.

The products thus obtained are smooth concentrated compounded dispersions which, however, may not be permanent in character and may tend to clot or thicken so as to yield finally a stiff paste. A small proportion of aqueous ammonia added to the dispersions prevents such thickening, improves their fluidity and renders them especially suitable for many manufacturing operations, for example, those involving the formation of rubber articles by dipping, moulding, electrical or electrophoretical deposition etc. Dried articals prepared from such products are found to be free from, for example, mineral salts, alkali, and hygroscopic substances, and are in a much more uniform condition as regards dispersion of the compounding ingredients than are corresponding articles prepared by a similar process from concentrated, compounded latex in which the necessary stabilization for concentration and storage has been effected with the aid of alkaline substances in a greater proportion, but exclusively of the non-volatile type.

If, however, the product is desired in a very thick or pasty condition (e. g. for spreading purposes, in which fluidity is not of such importance) the addition of the ammonia may be omitted without excessive loss of stability, and without increasing the proportion of non-volatile alkali.

Also if the product is to be used for purposes of electro-deposition, the necessary low conductivity may be obtained by concentrating to a smaller degree and adding either no ammonia or a much smaller quantity.

We have found it also advantageous to use ammonia-preserved latex in the process which has been previously subjected to dialysis or to partial concentration by centrifuging or to other known processes whereby the proportion of non-caoutchouc substances in the latex is reduced and a smaller proportion of potassium hydroxide or sodium hydroxide or other non-volatile alkali becomes sufficient to prevent coagulation during the process of concentration, it being understood that it is desirable to keep the proportion of these to a minimum to ensure high quality in the finished product. It will be understood that we can by our process prepare concentrates of compounded aqueous dispersions of rubber, gutta-percha, balata and similar vegetable resins or of two or more of such resins, the advantages of the process being realized with such a mixture in the same manner as where aqueous dispersions containing rubber or another similar vegetable resin alone is treated.

What we claim is:—

1. A process for preparing reversible compounded concentrates from rubber latex, which comprises intimately mixing dispersed powdered compounding ingredients such as sulphur and fillers with the latex in the presence of a stabilizer, and then concentrating the mixture by evaporation.

2. The process of preparing reversible compounded concentrates from latex, which comprises intimately mixing dispersed powdered compounding ingredients such as sulphur and fillers with latex in the presence of a stabilizer, concentrating the mixture by evaporation, and subjecting said mixture during evaporation to gentle agitation sufficient to maintain said compounding ingredients dispersed in said latex.

3. The process of preparing reversible compounded concentrates from rubber latex, which comprises intimately mixing powdered compounding ingredients such as sulphur and fillers with said latex, concentrating said mixture by evaporation in the presence of a stabilizer and subjecting said mixture during said concentration to a continuous agitation sufficient to maintain said dispersion without incorporating air therewith.

4. The process of claim 2 in which ammonia is added to the concentrates to increase stability and fluidity.

In witness whereof, we have hereunto signed our names.

DOUGLAS FRANK TWISS.
EDWARD ARTHUR MURPHY.